US011494481B2

(12) United States Patent
Hojo

(10) Patent No.: US 11,494,481 B2
(45) Date of Patent: Nov. 8, 2022

(54) AUTHENTICATION APPARATUS FOR AUTHENTICATING AUTHENTICATION TARGET DEVICE

(71) Applicant: CANON KABUSHIKI KAISHA, Tokyo (JP)

(72) Inventor: Yuta Hojo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 16/865,496

(22) Filed: May 4, 2020

(65) Prior Publication Data

US 2020/0356657 A1 Nov. 12, 2020

(30) Foreign Application Priority Data

May 10, 2019 (JP) .............................. JP2019-090078
Feb. 28, 2020 (JP) .............................. JP2020-033758

(51) Int. Cl.
*G06F 21/44* (2013.01)
*G06F 21/45* (2013.01)
*G06F 21/86* (2013.01)

(52) U.S. Cl.
CPC ............ *G06F 21/445* (2013.01); *G06F 21/45* (2013.01); *G06F 21/86* (2013.01)

(58) Field of Classification Search
CPC .............. G06F 21/445; G06F 21/608; G06F 2221/2129; G06F 21/44
See application file for complete search history.

(56) References Cited

U.S. PATENT DOCUMENTS

| 6,799,273 | B1* | 9/2004 | Oishi | G11B 20/00528 713/169 |
| 7,246,098 | B1* | 7/2007 | Walmsley | G06Q 20/3829 713/168 |
| 7,566,106 | B2* | 7/2009 | Silverbrook | B41J 2/17513 347/14 |
| 8,145,074 | B2* | 3/2012 | Kim | G03G 15/55 399/12 |
| 9,922,474 | B1* | 3/2018 | Rice | G06K 7/10366 |
| 2003/0170049 | A1* | 9/2003 | Itoh | G03G 15/0855 399/258 |
| 2004/0114175 | A1* | 6/2004 | Cherry | H04L 67/02 358/1.14 |
| 2004/0181681 | A1* | 9/2004 | Salisbury | G06F 21/84 713/170 |

(Continued)

FOREIGN PATENT DOCUMENTS

| JP | 2016-006544 A | 1/2016 |
| JP | 2018-093372 A | 6/2018 |
| WO | WO-2014109416 A1 * | 7/2014 ........... G06F 21/608 |

*Primary Examiner* — Lizbeth Torres-Diaz
(74) *Attorney, Agent, or Firm* — Venable LLP

(57) ABSTRACT

Each of the authentication apparatus and the authentication target device holds the last piece of authentication information subjected to an authentication process. When the authentication target device is reconnected to the authentication apparatus, the authentication apparatus collates the authentication information held in the authentication apparatus with the authentication information read out of the authentication target device. The authentication apparatus determines, based on the collation result, whether or not the authentication target device has been authenticated by a different authentication apparatus.

15 Claims, 9 Drawing Sheets

(56) References Cited

U.S. PATENT DOCUMENTS

| | | | |
|---|---|---|---|
| 2008/0104396 A1* | 5/2008 | Sato | H04L 9/32 |
| | | | 713/168 |
| 2011/0109938 A1* | 5/2011 | Refstrup | G06F 21/57 |
| | | | 358/1.15 |
| 2016/0124344 A1* | 5/2016 | Kojo | G03G 15/0856 |
| | | | 399/27 |
| 2017/0217196 A1* | 8/2017 | Kon | B41J 2/17553 |
| 2017/0293829 A1* | 10/2017 | Ittogi | G06F 21/608 |
| 2020/0356657 A1* | 11/2020 | Hojo | G06F 21/445 |
| 2021/0060964 A1* | 3/2021 | Oguchi | B41J 2/1752 |

* cited by examiner

AUTHENTICATION APPARATUS FOR AUTHENTICATING AUTHENTICATION TARGET DEVICE

BACKGROUND OF THE INVENTION

Field of the Invention

The present invention relates to an authentication apparatus for authenticating an authentication target device.

Description of the Related Art

A consumable (e.g., a toner cartridge or the like) intended to be attached to and removed from an image forming apparatus has an IC chip storing a large amount of control data used for controlling the consumable. The control data may be different for each consumable, and thus each time a consumable is exchanged, the image forming apparatus needs to read the control data out of the consumable. Reading-out of the control data takes a certain amount of time, and thus the reading-out of the control data is omitted in a case where a consumable is only removed or attached, without being exchanged with another consumable. In Japanese Patent Laid-Open No. 2016-006544, it is determined whether or not a consumable has been exchanged, by preliminarily assigning unique identification information for each consumable, and collating the identification information read out before removal of the consumable with the identification information read out after attachment of the consumable.

Occasionally, an IC chip authentication process may be executed in order to prevent replication or the like of an IC chip mounted on a consumable. An IC chip stores authentication information, and there is a risk that the IC chip may be replicated in the event of leakage of the authentication information. According to Japanese Patent Laid-Open No. 2018-093372, a plurality of authentication target keys are stored in an IC chip mounted on an authentication target device, and simultaneous leakage of all the authentication target keys is prevented by executing an authentication process by using different authentication target keys for each image forming apparatus.

The unique identification information for exchange detection of a consumable and the authentication information used for authentication of a consumable are originally intended for different application, and thus have been different from each other. Thus, implementation of the exchange detection function and the authentication function on a consumable needs both the unique identification information and the authentication information to be stored in a memory, and it has been necessary to increase a capacity of the memory. Then, it is conceivable to use the authentication target key also as the identification information. However, the authentication target key is different for each image forming apparatus, and thus, when a consumable removed from a first image forming apparatus is inserted to a second image forming apparatus, the second image forming apparatus cannot detect that the consumable has been used in the first image forming apparatus. That is, when an authentication target device removed from a first authentication apparatus is attached to a second authentication apparatus, the second authentication apparatus cannot determine that the authentication target device has been used by another authentication apparatus.

SUMMARY OF THE INVENTION

The present invention provides an authentication method for an authentication system having an authentication target device, and a first authentication device and a second authentication device configured to authenticate the authentication target device. The first authentication device requests the authentication target device to acquire a first piece of authentication information corresponding to the first authentication device, from a plurality of pieces of authentication information stored in the authentication target device. The authentication target device reads the first piece of authentication information requested by the first authentication device out of a storage unit of the authentication target device and transmits the first piece of authentication information to the first authentication device. The first authentication device receives the first piece of authentication information from the authentication target device, causes a first holding unit of the first authentication device to hold the first piece of authentication information, and executes an authentication operation for the first piece of authentication information. The second authentication device requests to which the authentication target device removed from the first authentication device is attached, the authentication target device to acquire a second piece of authentication information corresponding to the second authentication device, from a plurality of pieces of authentication information stored in the storage unit of the authentication target device. The authentication target device reads the second piece of authentication information requested by the second authentication device out of the storage unit of the authentication target device, causes a second holding unit of the authentication target device to hold the second piece of authentication information, and transmits the second piece of authentication information to the second authentication device. The second authentication device receives the second piece of authentication information from the authentication target device, and executes an authentication operation for the second piece of authentication information. The first authentication device requests to which the authentication target device removed from the second authentication device is attached again, the authentication target device to acquire the second piece of authentication information held in the second holding unit of the authentication target device. The authentication target device reads the second piece of authentication information requested by the first authentication device out of the second holding unit of the authentication target device, and transmits the second piece of authentication information to the first authentication device. The first authentication device receives the second piece of authentication information from the authentication target device, compares the second piece of authentication information with the first piece of authentication information held in the first holding unit of the first authentication device, and determines whether or not the authentication target device has been used by other authentication device different from the first authentication device.

Further features of the present invention will become apparent from the following description of exemplary embodiments (with reference to the attached drawings).

DESCRIPTION OF THE EMBODIMENTS

Figure 1:
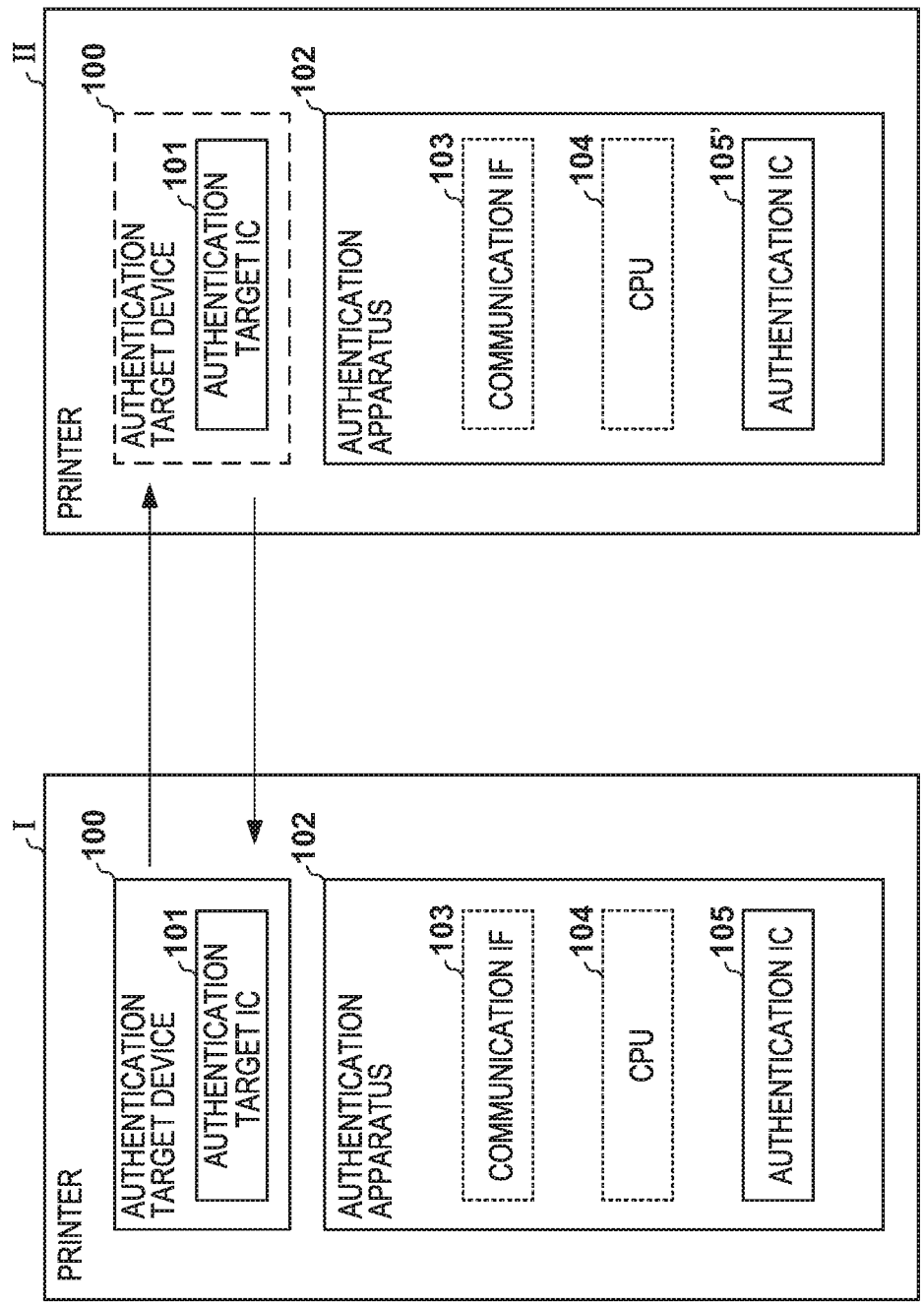
FIG. 1 is an explanatory view of an authentication system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Authentication System

FIG. 1 illustrates printers I and II as an example of an image forming apparatus. The printers I and II each has an authentication target device 100 and an authentication apparatus 102. The authentication apparatus 102 is mounted on each of the printers I and II. The authentication target device 100 is mounted on a consumable of each of the printers I and II. Accordingly, the authentication target device 100 can be attached to and removed from each of the printers I and II together with the consumable. The authentication apparatus 102 determines the authenticity of the consumable and the authentication target device 100 by authenticating the authentication target device 100. For example, a CPU 104 of the authentication apparatus 102 acquires authentication information (authentication target information) by transmitting a command to an authentication target IC 101 of the authentication target device 100 via a communication IF 103. The CPU 104 transfers the authentication information to an authentication IC 105. The authentication IC 105 determines the authenticity of the authentication information by executing an authentication operation for the authentication information, and transmits the determination result to the CPU 104. In a case where the determination result indicates that the consumable has been exchanged, the CPU 104 acquires control data of the consumable from the authentication target IC 101, and controls the consumable based on the control data. In a case where the determination result indicates that the consumable has not been exchanged, the CPU 104 skips the acquisition of the control data from the authentication target IC 101, and controls the consumable based on the control data held in the CPU 104. Note that, when the control data is changed in accordance with image formation, the CPU 104 also updates the control data stored in the authentication target IC 101. The control data may be, for example, the number of times of execution of image formation, the toner residual amount, or the like. IC is an abbreviation for Integrated Circuit.

Occasionally, as illustrated in FIG. 1, the consumable including the authentication target device 100 may be removed from the printer I and attached to the printer II. Further, the consumable may be removed from the printer II and attached to the printer I again. In this case, it may be desirable for the printer II to determine whether or not the consumable has been used in the printer I. Similarly, it may be desirable for the printer I to determine whether or not the consumable has been used in the printer II. For example, in a case where the authentication target IC 101 of the consumable includes control data such as life data that varies in accordance with the use state of the consumable, the printers I and II need to acquire the control data from the consumable. Here, in a case where the consumable attached to the printer I is only removed or attached, the control data of the consumable does not change. In this case, reading-out of the control data can be omitted. As illustrated in FIG. 1, when use of a consumable is switched to the printer II in the middle of its use, the printer I needs to read the control data out of the consumable.

Particularly, in the present embodiment, each of the authentication apparatus 102 and the authentication target device 100 holds the last piece of authentication information subjected to an authentication process. When the authentication target device 100 is reconnected to the authentication apparatus 102, the authentication apparatus 102 collates the authentication information held in the authentication apparatus 102 with the authentication information read out of the authentication target device 100. The authentication apparatus 102 determines, based on the collation result, whether or not the authentication target device 100 has been authenticated by a different authentication apparatus 102.

Authentication Target IC

Figure 2:
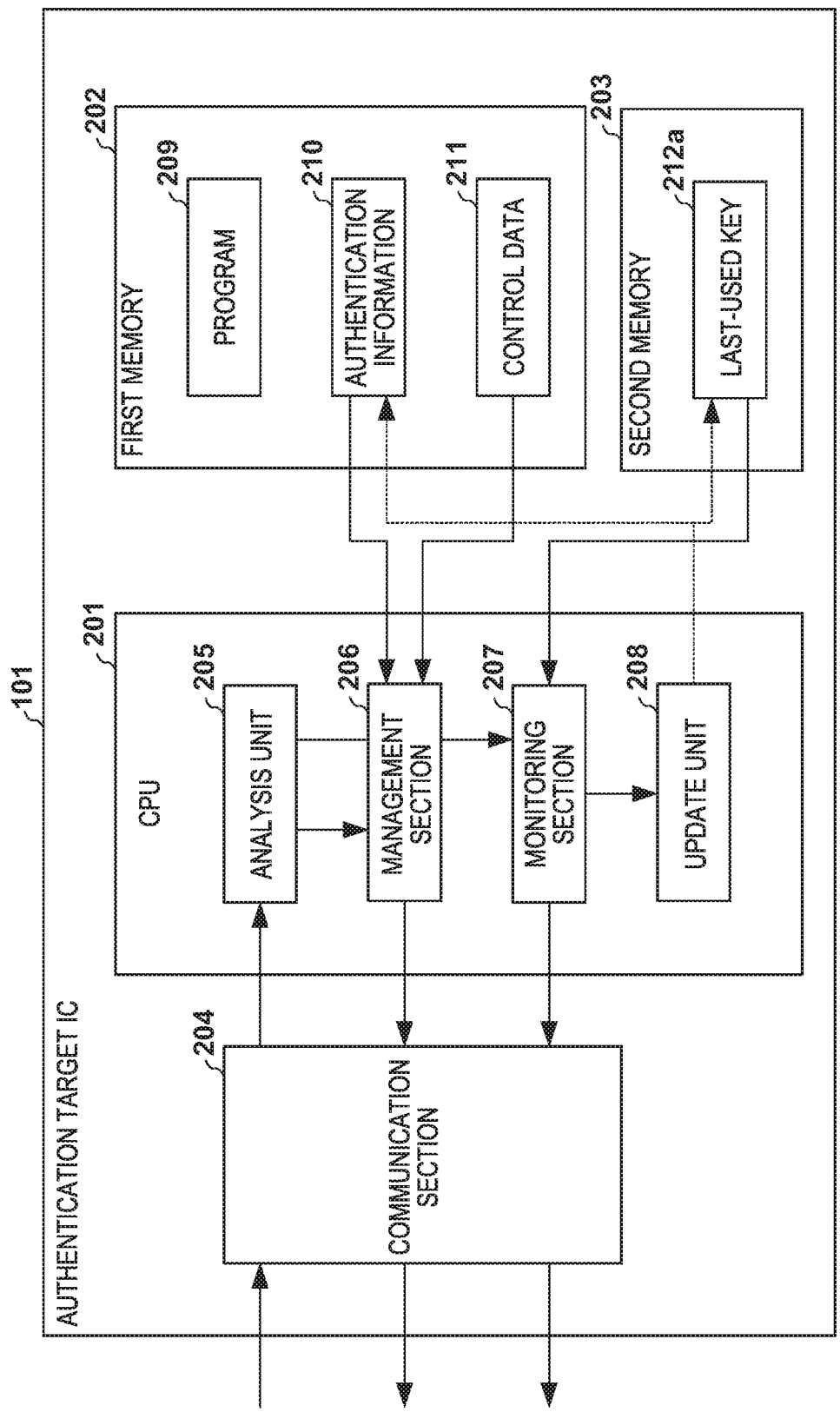
FIG. 2 is an explanatory view of an authentication target IC.

FIG. 2 illustrates the authentication target IC 101. A CPU 201 realizes various functions by executing a program 209. The program 209 is stored in a first memory 202 that is a non-volatile memory. For example, an analysis unit 205 analyzes a command received from the authentication apparatus 102 via a communication section 204 and executes a process corresponding to the command. In a case where the received command is a first command, a management section 206 reads out of the first memory 202, authentication information 210 specified by the first command and transmits the authentication information 210 to the authentication apparatus 102 via the communication section 204. The first command may thus be a command requesting acquisition of authentication information. Note that the first memory 202 stores a plurality of pieces of the authentication information 210 respectively associated with different pieces of key identification information. In a case where the received command is a second command, a monitoring section 207 reads a last-used key 212a out of a second memory 203 and transmits the last-used key 212a to the authentication apparatus 102 via the communication section 204. The second command may thus be a command requesting acquisition of the last-used key 212a. The last-used key 212a refers to the last piece of the authentication information 210 used in the authentication apparatus 102. It is not essential for the last-used key 212a to include a key, and the last-used key 212a may include derivative information, or the like derived from the key. The authentication information 210 may include, for example, an authentication key (may also be referred to as an authentication target key) and a counter. The counter is a variable for counting the number of times the authentication key has been used in the authentication operation by the authentication apparatus 102. An update unit 208 increments the counter each time the authentication information 210 is used in the authentication operation by the authentication apparatus 102, and writes the counter value to the second memory 203 and the first memory 202.

Authentication Apparatus

Figure 3:
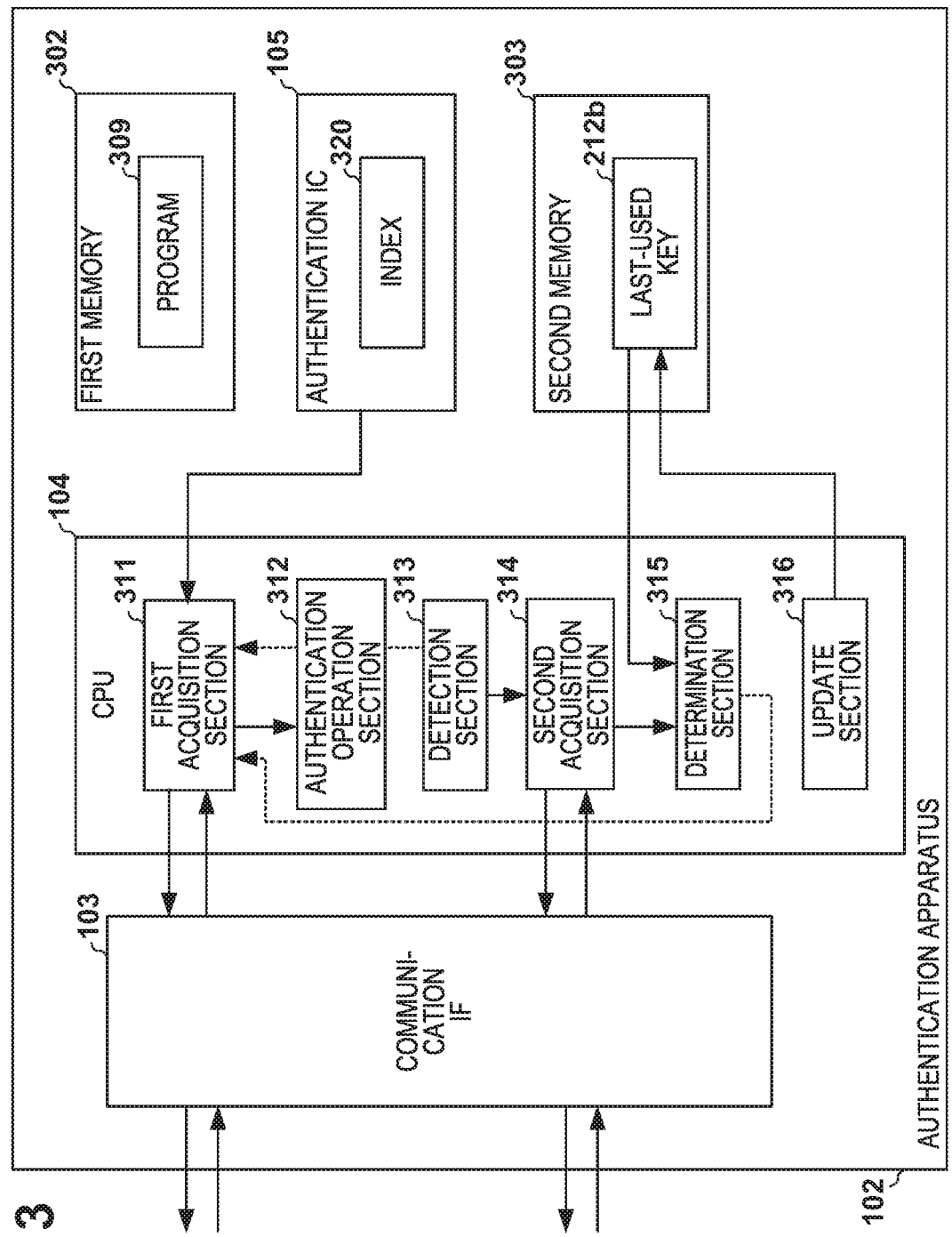
FIG. 3 is an explanatory view of an authentication apparatus.

FIG. 3 illustrates details of the authentication apparatus 102. The CPU 104 realizes various functions by executing a program 309 stored in a first memory 302. Note that the first memory 302 is a non-volatile memory. A second memory 303 is a volatile memory such as a RAM. For example, a detection section 313 detects whether or not a last-used key 212b is stored in the second memory 303. In a case where the last-used key 212b is not stored, a first acquisition section 311 transmits a first command to the authentication target IC 101 via the communication IF 103 and receives the authentication information 210 as a response. Note that the first acquisition section 311 reads out an index 320 that is key identification information stored in a nonvolatile memory of the authentication IC 105, and transmits the index 320 included in the first command. The first acquisition section 311 passes the received authentication information 210 to an authentication operation section 312. The authentication operation section 312 passes the authentication information 210 to the authentication IC 105. The authentication IC 105 may have an operation unit that executes an authentication operation for the authentication information 210. The authentication IC 105 passes the operation result (authentication OK/NG) to the authentication operation section 312. Note that the authentication operation section 312 causes an update section 316 to hold the authentication information 210 in the second memory 303 as the last-used key 212b. On this occasion, the update section 316 updates (increments) the counter value included in the authentication information 210.

When the detection section 313 detects that the last-used key 212b is not held in the second memory 303, a second acquisition section 314 transmits the second command to the authentication target IC 101 via the communication IF 103. The second acquisition section 314 receives, as a response to the second command, the last-used key 212a held by the authentication target IC 101 and passes the last-used key 212a to a determination section 315. The determination section 315 compares the last-used key 212a held by the authentication target IC 101 with the last-used key 212b held in the second memory 303 to determine whether or not the authentication target device 100 has been authenticated by another authentication apparatus 102. In a case where the last-used key 212a and the last-used key 212b match, the determination section 315 determines that the authentication target device 100 has not been exchanged. In a case where the last-used key 212a and the last-used key 212b do not match, the determination section 315 determines that the authentication target device 100 has been exchanged. In a case where the authentication target device 100 has not been exchanged, the CPU 104 omits acquisition of control data 211 from the authentication target device 100. In a case where the authentication target device 100 has been exchanged, the CPU 104 executes acquisition of the control data 211 from the authentication target device 100. For example, the CPU 104 acquires the control data 211 by transmitting a third command to the authentication target IC 101.

Note that at least one of the communication IF 103, the CPU 104, the first memory 302, and the second memory 303 may be implemented inside the authentication IC 105. Alternatively, the authentication IC 105 may be realized by the CPU 104.

Exchange Detection Method

Figure 4A:
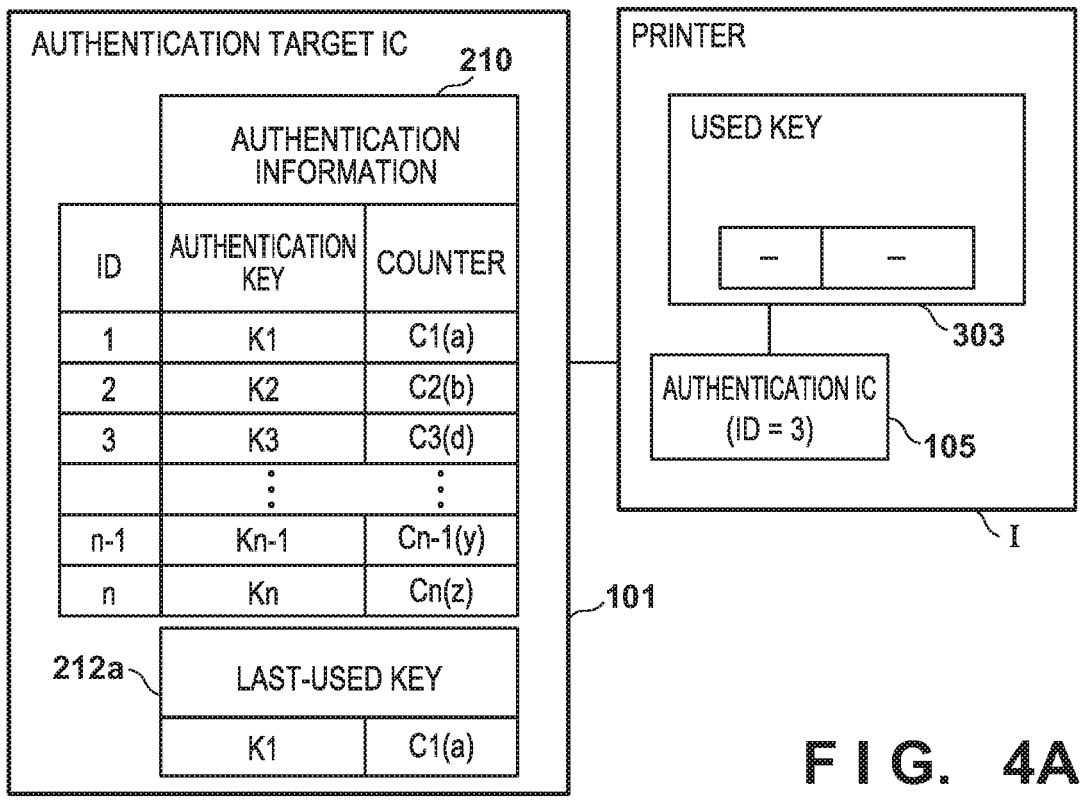
FIGS. 4A to 4F are explanatory views of authentication information.

FIGS. 4A to 4F are explanatory views of the concept of an exchange detection method of a consumable (authentication target device 100). FIG. 4A illustrates a state in which the printer I to which a consumable including the authentication target device 100 is attached is powered and activated by a commercial power source. The authentication target IC 101 holds the authentication information 210 having an authentication key K1 and a counter C1 as the last-used key 212a. Here, the key identification information (index) is denoted by ID. For example, an authentication key provided with i as the ID is denoted by Ki. A counter provided with i as the ID is denoted by Ci. Ci (a) indicates that a value of the counter Ci is a. The value of the counter Ci is incremented by one each time an authentication operation is executed by the authentication apparatus 102. In addition, according to FIG. 4A, the authentication target IC 101 has n pieces of the authentication information 210. The authentication IC 105 of the printer I holds "3" as the index 320. The printer I has just been activated, and thus the last-used key 212b is not stored in the second memory 303. Accordingly, the authentication apparatus 102 executes an authentication process of the authentication target IC 101 and reading-out of control data.

Figure 4B:
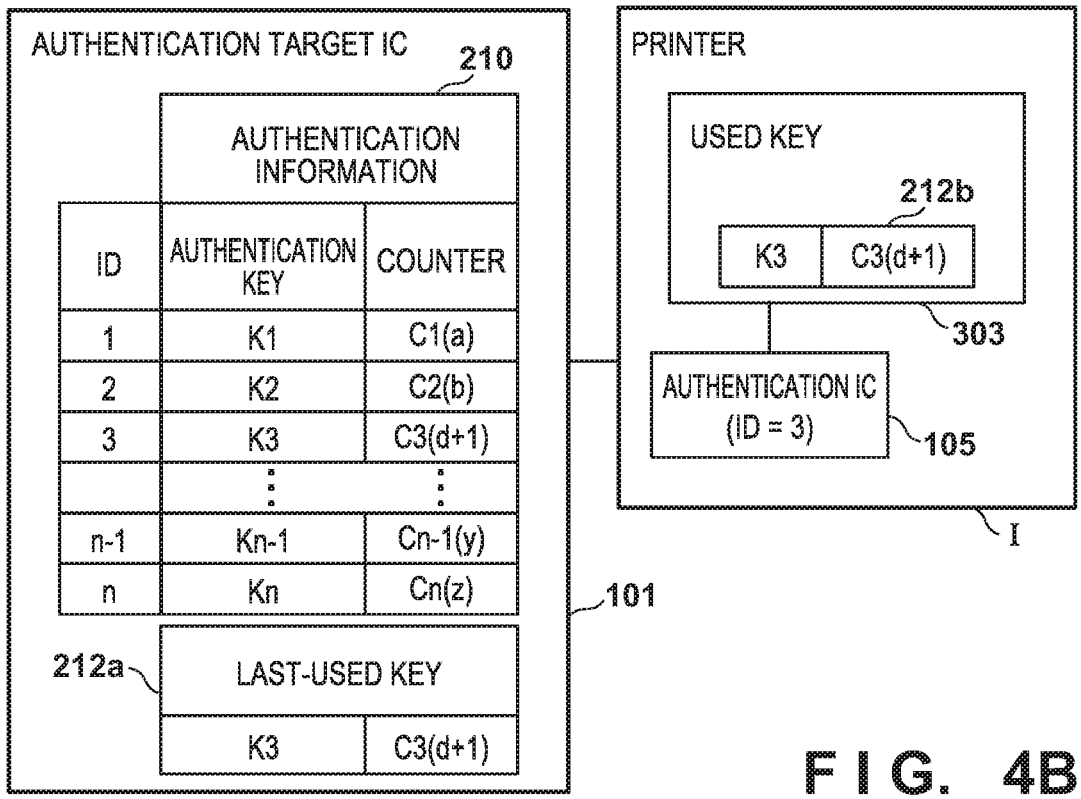

FIG. 4B illustrates a state in which the authentication process of the authentication target IC 101 is executed by the printer I. The printer I reads an authentication key K3 corresponding to its own ID (=3) out of the authentication target IC 101 and executes the authentication operation. For example, the authentication IC 105 substitutes the authentication key K3 into a one-way function to determine an authentication value, and compares the authentication value with a private key held by the authentication IC 105. When the authentication value and the private key match, the authentication IC 105 returns an authentication result indicating successful authentication to the CPU 104. When the authentication value and the private key do not match, the authentication IC 105 returns an authentication result indicating failed authentication to the CPU 104. Here, it is assumed that authentication has been successful. The CPU 104 holds, in the second memory 303, the authentication key K3 and a counter C3 that are the authentication information 210 subjected to the authentication process. On this occasion, the CPU 104 adds 1 to a value d of the counter C3. That is, the counter value C3 (d) is updated to C3 (d+1). Note that the authentication target IC 101 also updates the counter C3 (d) of the authentication information 210 to C3 (d+1). Further, the authentication target IC 101 holds the key K3 and the counter C3 (d+1) in the second memory 203 as the last-used key 212a.

Figure 4C:
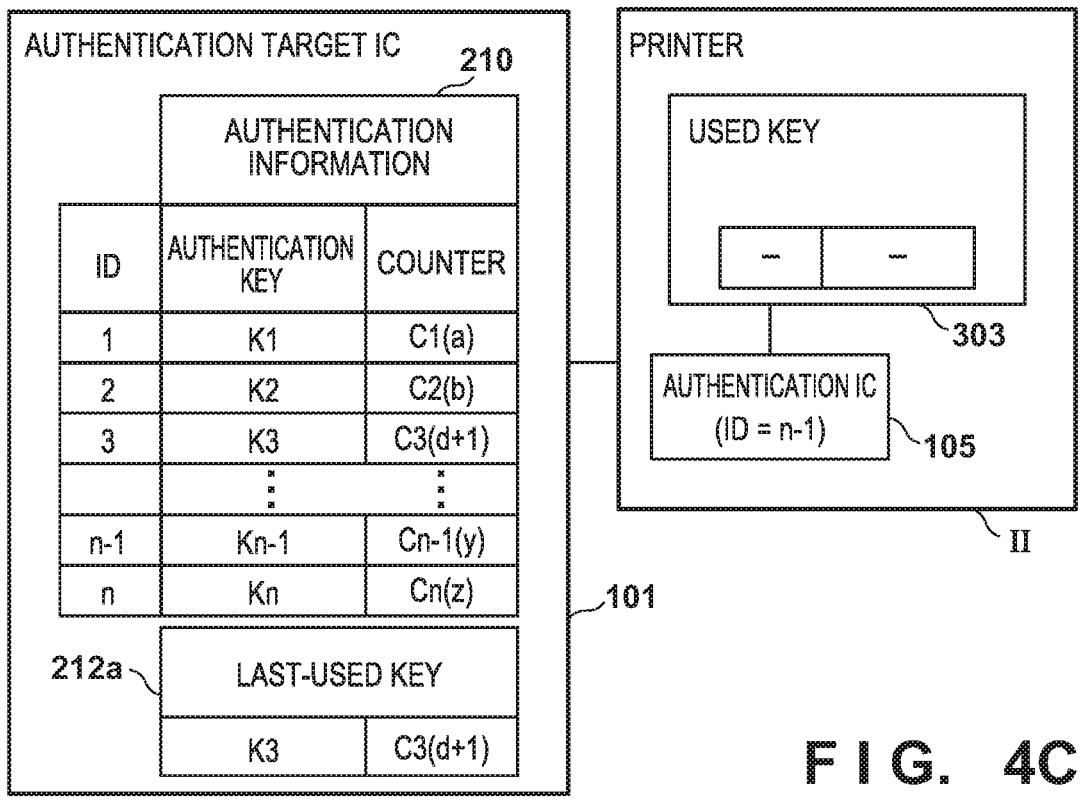

FIG. 4C illustrates a state in which a consumable on which the authentication target device 100 is mounted has been removed from the printer I and inserted to the printer II. Note that the printer II is also activated with power being supplied from a commercial power supply. As illustrated in FIG. 4C, the authentication apparatus 102 does not hold the last-used key 212b. On the other hand, the authentication target IC 101 holds the key K3 and the counter value C3 (d+1) as the last-used key 212a. Here, the ID assigned to the authentication IC 105 of the printer II is n−1.

Figure 4D:
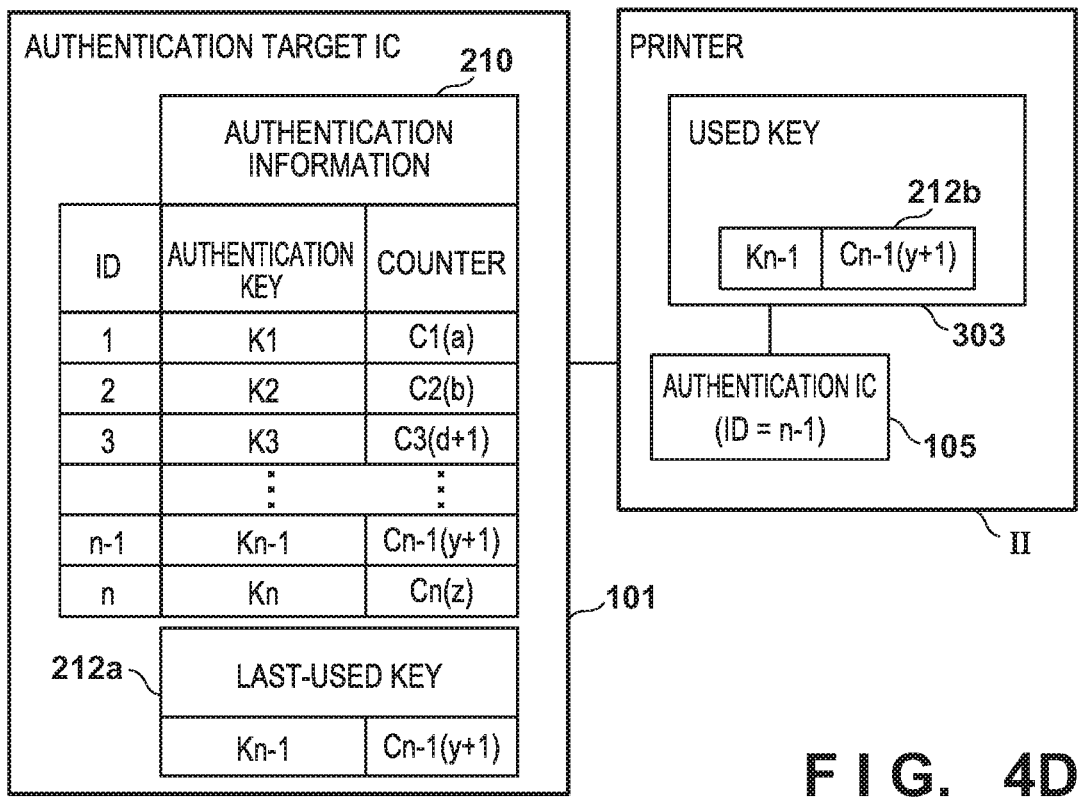

FIG. 4D illustrates a state in which the printer II has executed the authentication process for the authentication target IC 101. The printer II acquires, from the authentication target IC 101, an authentication key Kn−1 corresponding to the ID=n−1 assigned to its own authentication IC 105 and executes the authentication process. The CPU 104 updates a counter value Cn−1 (y) associated with the authentication key Kn−1 to a counter value Cn−1 (y+1) and holds the authentication key Kn−1 and the counter value Cn−1 (y+1) as the last-used key 212b. Similarly, the authentication target IC 101 updates the counter value Cn−1 (y) associated with the authentication key Kn−1 to the counter value Cn−1 (y+1) and holds the authentication key Kn−1 and the counter value Cn−1 (y+1) as the last-used key 212a. Further, the authentication target IC 101 updates the counter value Cn−1 (y) associated with the authentication key Kn−1 stored in the first memory 202 to the counter value Cn−1 (y+1).

Figure 4E:
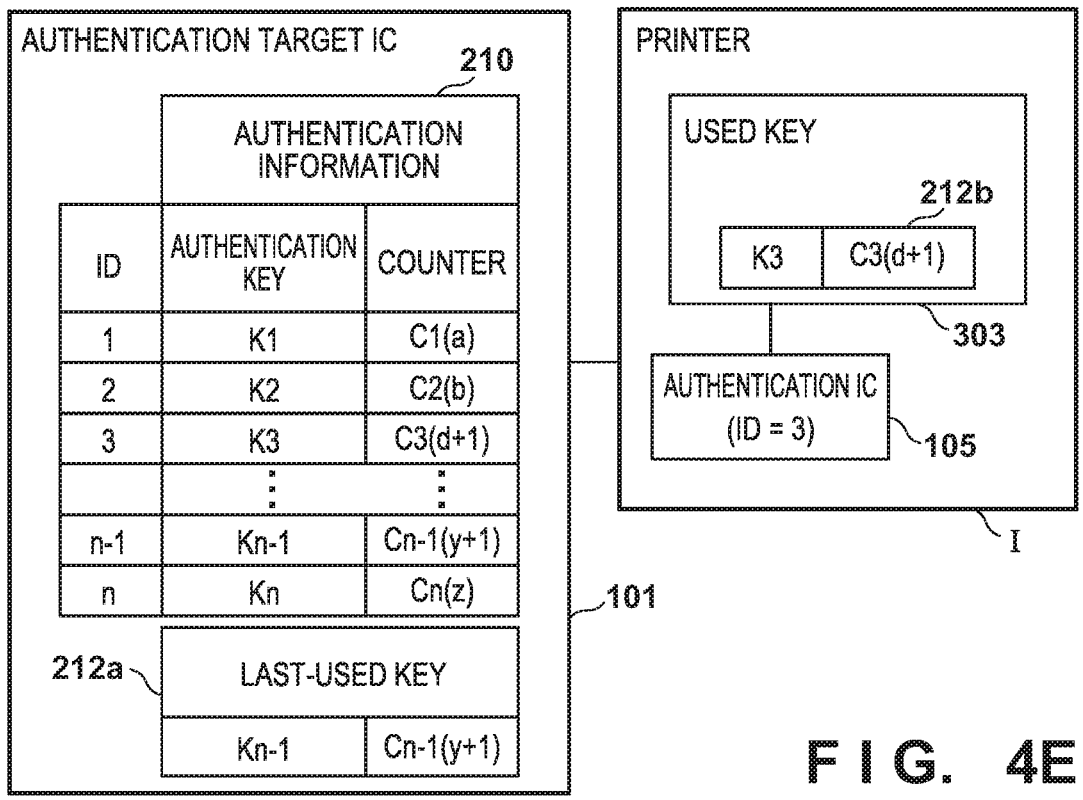

FIG. 4E illustrates a state in which a consumable on which the authentication target device 100 is mounted has been removed from the printer II and inserted to the printer I again. In this state, the authentication process has not been performed yet. The printer I acquires the authentication key K3 associated with ID=3 and executes the authentication process. However, the counter value C3 (d+1) of the authentication key K3 held in the first memory 202 matches the last-used key 212b held by the printer I. Accordingly, it is not possible by using the authentication information 210 stored in the first memory 202 to detect that the authentication target device 100 has been authenticated by other authentication apparatus 102. On the other hand, the last-used key 212a held in the second memory 203 of the authentication target IC 101 is the authentication information 210 used by the printer II. Accordingly, the CPU 104 can detect that the authentication target device 100 has been authenticated by another authentication apparatus 102, by collating the last-used key 212a with the last-used key 212b. That is, the printer I can detect that the consumable has been used by another printer. In this case, the printer I acquires the latest control data 211 from the authentication target device 100. Accordingly, the printer I can control the consumable with high precision.

Figure 4F:
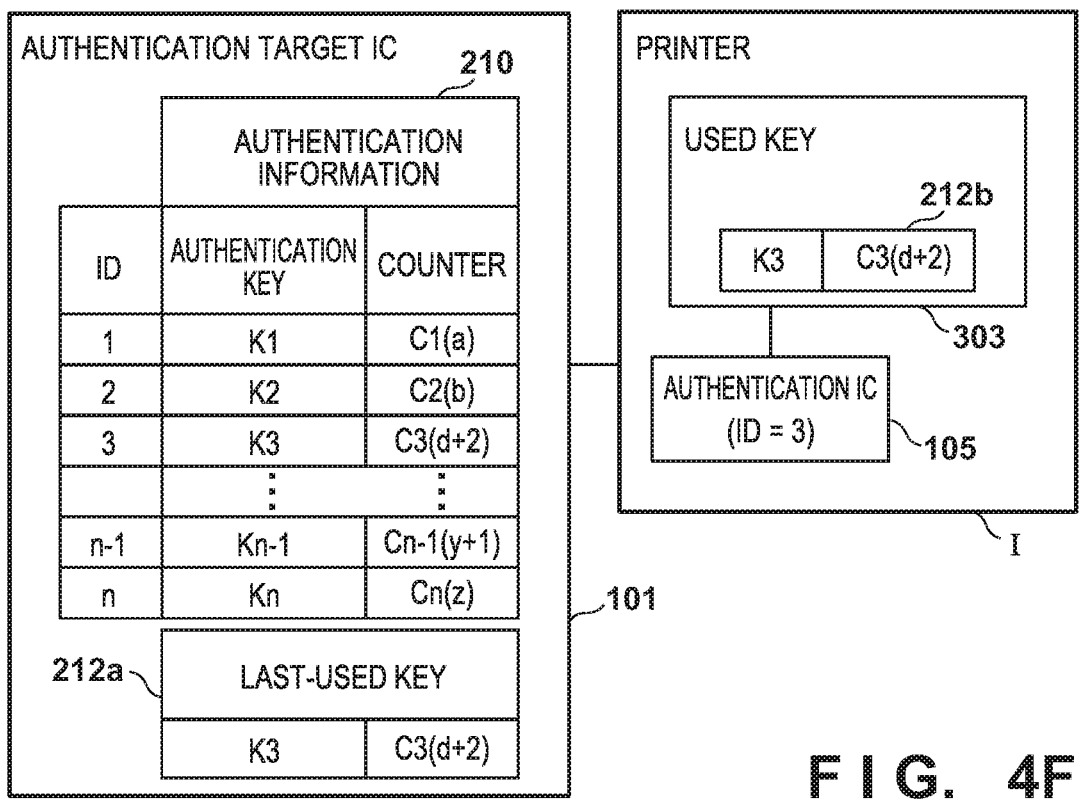

FIG. 4F illustrates a state in which the authentication process has been executed again for the authentication target IC 101 by the printer I. Values of the counter C3 held in the second memory 203 in the authentication target IC, the counter C3 stored in the first memory 202, and the counter C3 of the second memory 303 held in the printer I are updated.

Both the authentication target device 100 and the authentication apparatus 102 hold the last piece of the authentication information 210 subjected to the authentication process, and thus it becomes possible to detect that the authentication target device 100 has been used by another authentication apparatus 102. That is, it becomes possible to detect that a consumable (exchangeable part) on which the authentication target device 100 is mounted has been exchanged. Further, it becomes possible to determine whether or not reading of the control data 211 out of the consumable can be omitted.

Flowchart

Figure 5:
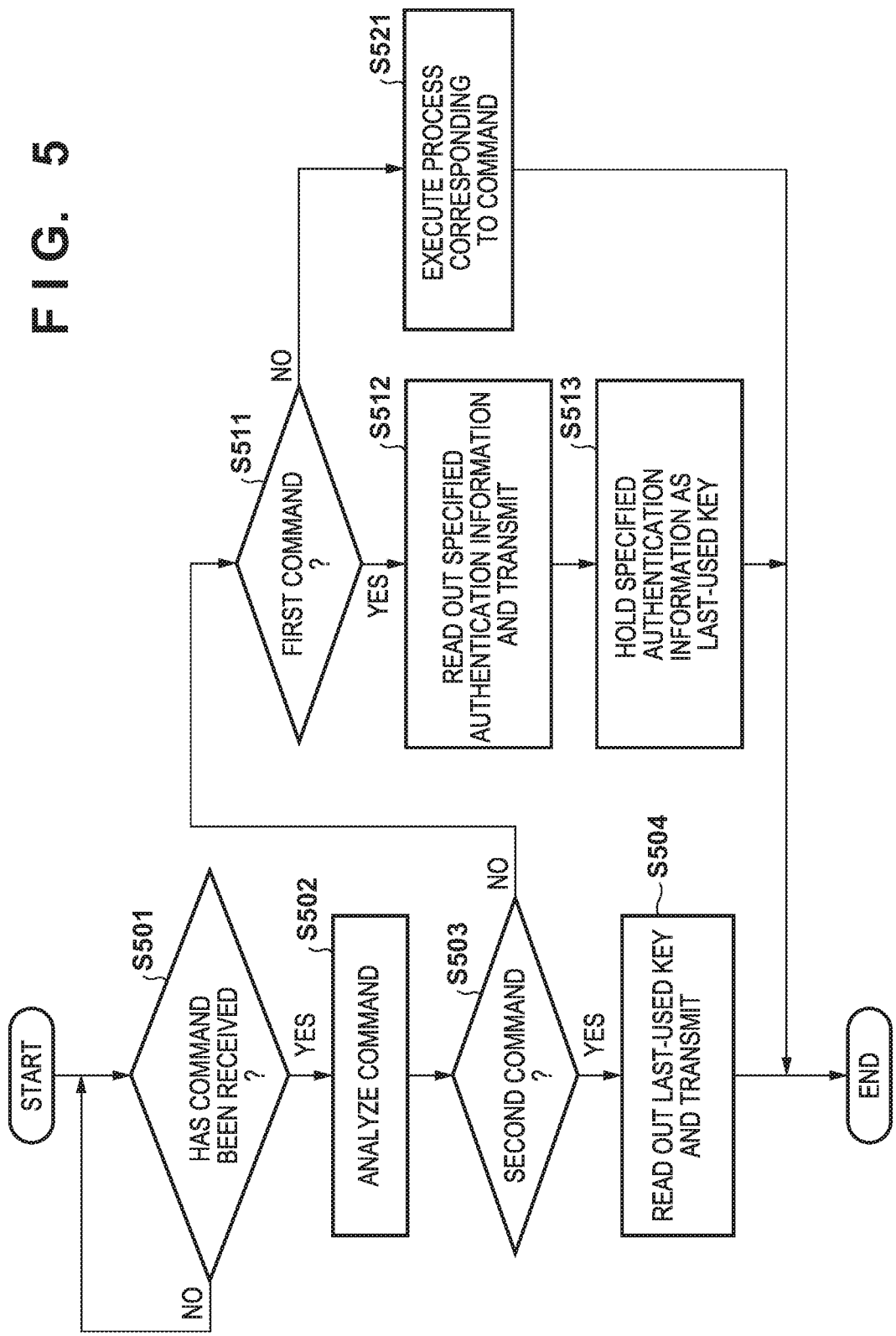
FIG. 5 is a flowchart illustrating an operation of an authentication target device.

FIG. 5 is a flowchart illustrating an authentication process executed by the authentication target IC 101.

At S501, the CPU 201 (analysis unit 205) determines whether or not a command has been received from the authentication apparatus 102. When the command is received, the CPU 201 proceeds to S502.

At S502, the CPU 201 (analysis unit 205) analyzes the command received from the authentication apparatus 102.

At S503, the CPU 201 (analysis unit 205) determines, based on the analysis result, whether or not the command is the second command. In a case where the command is the second command, the CPU 201 proceeds to S504. In a case where the command is not the second command, the CPU 201 proceeds to S511.

In a case where the second command is received, at S504, the CPU 201 (monitoring section 207) reads the last-used key 212a out of the second memory 203 and transmits the last-used key 212a to the authentication apparatus 102 via the communication section 204.

In a case where the second command is not received, at S511, the CPU 201 (analysis unit 205) determines, based on the analysis result, whether or not the command is the first command. In a case where the command is the first command, the CPU 201 proceeds to S512. In a case where the command is not the first command, the CPU 201 proceeds to S521.

At S512, the CPU 201 (management section 206) reads out of the first memory 202, the authentication information 210 associated with the ID specified by the first command, and transmits the authentication information 210 to the authentication apparatus 102.

At S513, the CPU 201 (monitoring section 207) holds, in the second memory 203, the authentication information 210 associated with the ID specified by the first command as the last-used key 212a. On this occasion, the update unit 208 updates the counter values of respective pieces of the authentication information 210 in the first memory 202 and the second memory 203.

In a case where another command is received at S511, the CPU 201 executes a process corresponding to the received command. For example, in a case where the third command is received, the CPU 201 reads the control data 211 out of the first memory 202 and transmits the control data 211 to the authentication apparatus 102.

Figure 6:
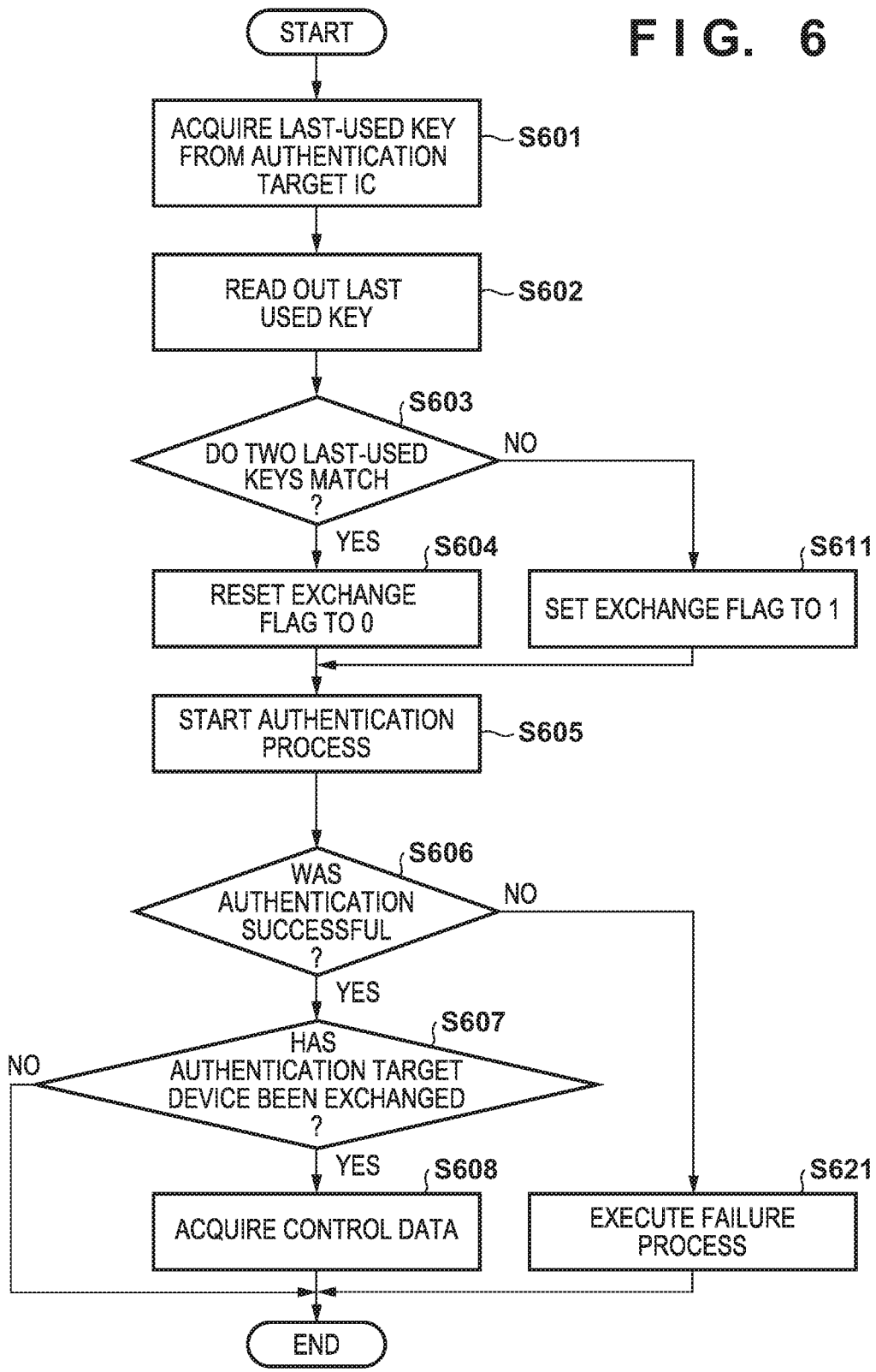
FIG. 6 is a flowchart illustrating an operation of an authentication apparatus.

FIG. 6 is a flowchart illustrating an authentication process (exchange detection method) executed by the CPU 104 of the authentication apparatus 102.

Exchange Detection

At S601, the CPU 104 (second acquisition section 314) acquires the last-used key 212a from the authentication target IC 101. For example, the second acquisition section 314 transmits the second command to the authentication target IC 101, and receives the last-used key 212a as a response.

At S602, the CPU 104 (second acquisition section 314 or the determination section 315) reads the last-used key 212b out of the second memory 303.

At S603, the CPU 104 (determination section 315) determines whether or not the last-used key 212a and the last-used key 212b match. When the last-used key 212a and the last-used key 212b match, the authentication target device 100 (consumable) has not been exchanged and thus the CPU 104 proceeds to S604. At S604, the CPU 104 resets an exchange flag to 0. Here, "0" indicates that the authentication target device 100 (consumable) has not been exchanged. The exchange flag is one-bit information, and may be held in the second memory 303. Subsequently, the CPU 104 proceeds to S605. On the other hand, when the last-used key 212a and the last-used key 212b do not match, the CPU 104 proceeds to S611. At S611, the CPU 104 sets the exchange flag to 1. Here, "1" indicates that the authentication target device 100 (consumable) has been exchanged. Subsequently, the CPU 104 proceeds to S605.

Authentication Process

At S605, the CPU 104 (authentication operation section 312) starts the authentication process. The authentication operation section 312 requests the authentication information 210 from the first acquisition section 311. The first acquisition section 311 transmits, to the authentication target IC 101, the first command including the ID (index 320) acquired from the authentication IC 105. The first acquisition section 311 passes, to the authentication operation section 312, the authentication information 210 received from the authentication target IC 101. The authentication operation section 312 passes the authentication key K included in the authentication information 210 to the authentication IC 105, and the authentication IC 105 executes the authentication operation. The authentication operation section 312 receives the authentication result from the authentication IC 105.

At S606, the CPU 104 (authentication operation section 312) determines whether or not authentication of the authentication target IC 101 has been successful. In a case where the authentication has been successful, the CPU 104 proceeds to S607. In a case where the authentication has failed, the CPU 104 proceeds to S621. At S621, the CPU 104 executes a failure process. The failure process refers to, for example, an output process of warning information.

Acquisition of Control Data

At S607, the CPU 104 (determination section 315) determines, based on the exchange flag, whether or not the authentication target device 100 has been exchanged. For example, the determination section 315 determines whether or not the authentication target device 100 has been authenticated (used) by another authentication apparatus 102. In a case where the authentication target device 100 has not been exchanged, the CPU 104 skips acquisition of the control data 211. On the other hand, in a case where the authentication target device 100 has been exchanged, the CPU 104 proceeds to S608.

At S608, the CPU 104 acquires the control data 211 from the authentication target IC 101. The CPU 104 acquires the control data 211 by transmitting the third command to the authentication target IC 101. Note that, when the control data 211 changes in accordance with image formation or the like, the CPU 104 updates the control data 211 held in the authentication target IC 101. For example, the CPU 104 transmits the latest control data 211 together with a fourth command to the authentication target IC 101. When the CPU 201 of the authentication target IC 101 receives the latest control data 211 together with the fourth command, the CPU 201 updates the control data 211 of the first memory 202.

Printer Structure

Figure 7:
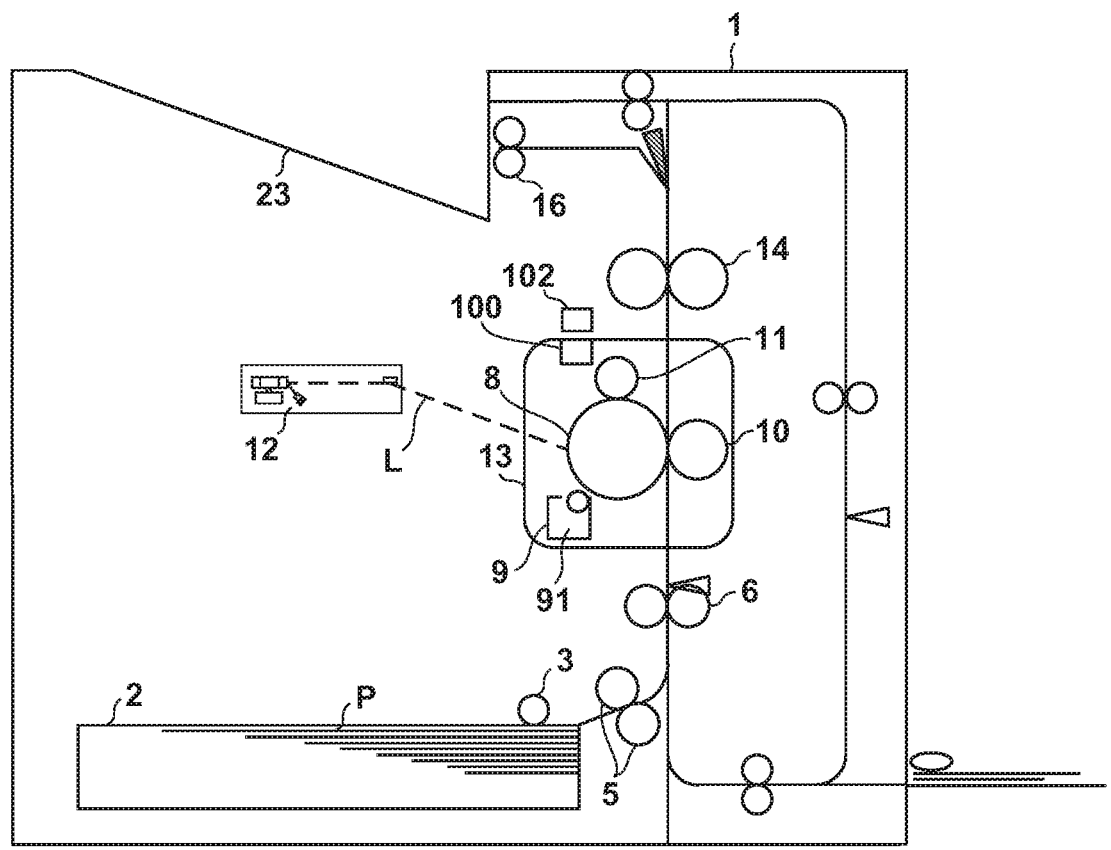
FIG. 7 is an explanatory view of an image forming apparatus.

FIG. 7 illustrates an electrophotographic image forming apparatus 1 that functions as the printers I and II. Any image forming apparatus that uses a consumable is applicable as the printers I and II. That is, the printers I and II may be an inkjet type image forming apparatus, a thermal transfer type image forming apparatus, or the like.

A feed roller 3 feeds a sheet P from a stack in a cassette 2 to a conveying path. Conveying rollers 5 and 6 convey the sheet P further downstream in the conveyance direction of the sheet P. An image forming unit 13 has a process cartridge as a consumable on which the authentication target device 100 is mounted. For example, the process cartridge may be an exchangeable part attachable to and removable from the image forming apparatus. The process cartridge may be formed by integrating a photosensitive drum 8, a developing device 9 including a developing container containing toner, and a charge roller 11.

Note that, the exchangeable part is not limited to the process cartridge, and may be a developing cartridge or a toner cartridge. The developing cartridge is an exchangeable part that only has the developing device 9 and that is attachable to and removable from the image forming apparatus. The toner cartridge refers to an exchangeable part that only has a toner container 91 containing toner, and that is attachable to and removable from the image forming apparatus.

The charging roller 11 uniformly charges a surface of the photosensitive drum 8. An exposure device 12 forms an electrostatic latent image by irradiating the surface of the photosensitive drum 8 with a laser beam L in accordance with an image signal. The developing device 9 has a developing roller and a toner container, and develops the electrostatic latent image by using toner to generate a toner image. A transfer member 10 transfers the toner image from the photosensitive drum 8 to the sheet P. A fixing device 14 fixes the toner image on the sheet P by applying heat and pressure to the toner image and the sheet P. A discharge roller 16 discharges the sheet P to a tray 23. Note that the CPU 104 of the authentication apparatus 102 may adjust charging voltage, developing voltage, an amount of laser beam, transfer voltage, or the like, according to the control data 211 read out of the authentication target device 100.

Technical Ideas Derived from Embodiments

Viewpoint 1

As illustrated in FIG. 1, there is provided an authentication method for an authentication system having the authentication target device 100, a first authentication apparatus and a second authentication apparatus configured to authenticate the authentication target apparatus. As an example, the first authentication apparatus is the authentication apparatus 102 mounted on the printer I. The second authentication apparatus is the authentication apparatus 102 mounted on the printer II.

As illustrated in FIG. 4A, the first authentication apparatus requests the authentication target device 100 to acquire a first piece of authentication information corresponding to the first authentication apparatus, from a plurality of pieces of authentication information stored in the authentication target device 100. The authentication target device 100 reads the first piece of authentication information requested by the first authentication apparatus (e.g. K3, C3) out of a storage unit (e.g., second memory 203) of the authentication target apparatus and transmits the first piece of authentication information to the first authentication apparatus. The first authentication apparatus receives the first piece of authentication information from the authentication target device 100 and causes a first holding unit (e.g., second memory 303) of the first authentication apparatus to hold the first piece of authentication information (e.g., last-used key 212b). Further, the first authentication apparatus executes an authentication operation for the first piece of authentication information. As described in relation to FIG. 1 and FIGS. 4B and 4C, the authentication target device 100 may be removed from the first authentication apparatus and attached to the second authentication apparatus.

As illustrated in FIG. 4D or the like, the second authentication apparatus requests the authentication target device 100 to acquire a second piece of authentication information (e.g., Kn−1, Cn−1) corresponding to the second authentication apparatus, from a plurality of pieces of authentication information stored in the storage unit of the authentication target device 100. The authentication target device 100 reads the second piece of authentication information requested by the second authentication apparatus out of the storage unit of the authentication target device 100 and causes a second holding unit (e.g., second memory 203) of the authentication target device 100 to hold the second piece of authentication information. The authentication target device 100 transmits the second piece of authentication information (e.g., Kn−1, Cn−1) to the second authentication apparatus. The second authentication apparatus receives the second piece of authentication information from the authentication target device 100, and executes an authentication operation for the second piece of authentication information.

As described in relation to FIG. 1 and FIGS. 4D and 4E, the authentication target device 100 is removed from the second authentication apparatus and attached to the first authentication apparatus again. The first authentication apparatus requests the authentication target device 100 to acquire the second piece of authentication information (e.g., last-used key 212a) held in the second holding unit of the authentication target device 100. The authentication target device 100 reads the second piece of authentication information requested by the first authentication apparatus out of the second holding unit of the authentication target apparatus, and transmits the second piece of authentication information to the first authentication apparatus. The first authentication apparatus receives the second piece of authentication information from the authentication target device 100 and compares the second piece of authentication information with the first piece of authentication information held in the first holding unit of the first authentication apparatus. Accordingly, the first authentication apparatus determines (exchange detection) whether or not the authentication target device 100 has been used by another authentication apparatus different from the first authentication apparatus. As a consequence, exchange detection of the authentication target apparatus is realized by a simple technique. Particularly, exchange detection becomes possible also for an authentication target apparatus having a plurality of pieces of authentication information, which has been conventionally impossible.

Viewpoint 2

There may be the case where the second piece of authentication information acquired from the second holding unit of the authentication target device 100 matches the first piece of authentication information held in the first holding unit of the first authentication apparatus. In this case, the first authentication apparatus may determine that the authentication target device 100 has not been used by another authentication apparatus different from the first authentication apparatus. There may also be the case where the second piece of authentication information acquired from the second holding unit of the authentication target apparatus is different from the first piece of authentication information held in the first holding unit of the first authentication apparatus. In this case, the first authentication apparatus may determine that the authentication target device 100 has been used by another authentication apparatus different from the first authentication apparatus. As thus described, exchange detection of the authentication target apparatus can be realized by a simple technique.

Viewpoints 3 and 16

As illustrated in FIG. 4A or the like, each of the plurality of pieces of authentication information 210 may include authentication keys K1 to Kn. The authentication apparatus 102 may execute an authentication operation for the authentication key K. As thus described, the authentication information 210 may have the authentication key K. Note that derivative information determined from the authentication key K by a derivative operation may be used in the authentication process. In this case, it becomes possible to keep the authentication key K in a secret state.

Viewpoint 4

As illustrated in FIG. 4A or the like, each of the plurality of pieces of authentication information 210 may further include counters C1 to Cn. When the authentication operation is executed for the authentication key Ki, the authentication target device 100 may update the counter Ci associated with the authentication key Ki. Accordingly, it becomes possible to manage the number of times the authentication process has applied to the authentication key Ki.

Viewpoint 5

The first authentication apparatus may determine whether or not the authentication target apparatus has been used by another authentication apparatus different from the first authentication apparatus, based on whether or not both a first condition and a second condition are satisfied. The first condition indicates that an authentication key included in the second piece of authentication information acquired from the second holding unit of the authentication target device 100 matches an authentication key included in the first piece of authentication information held in the first holding unit of the first authentication apparatus. The second condition indicates that a counter included in the second piece of authentication information acquired from the second holding unit of the authentication target device matches a counter included in the first piece of authentication information held in the first holding unit of the first authentication apparatus. For example, a first ID may be provided to a plurality of the authentication apparatuses 102 to be shipped to a first shipping region. A second ID may be provided to a plurality of the authentication apparatuses 102 to be shipped to a second shipping region. In this case, the first authentication apparatus and the second authentication apparatus have the same ID in the first shipping region, and thus the authentication key K also becomes common. Accordingly, the counter C is also taken into account, and thus exchange detection may be realized with higher precision.

Viewpoints 6 and 7

As described in relation to the detection section 313, the first authentication apparatus may determine or detect whether or not authentication information is held in the first holding unit of the first authentication apparatus. In a case where no authentication information is held in the first holding unit, the first authentication apparatus may transmit a first command requesting the authentication target device to acquire the first piece of authentication information corresponding to the first authentication apparatus. In a case where authentication information is held in the first holding unit, the first authentication apparatus may transmit a second command for requesting the authentication target device to acquire the second piece of authentication information held in the second holding unit of the authentication target device. The commands are used as described above, and thus it becomes possible to easily clarify the type of information requested. In addition, the authentication apparatus 102 and the authentication target device 100 generally communicate by a command-response scheme, and thus the present invention may be implemented easily. The first command and the second command may be different commands. Accordingly, it becomes possible to clarify the type of information required. Note that the type of information required may be clarified by the same command or additional instruction included in or added to the command.

Viewpoint 8

As illustrated in FIG. 3, the first acquisition section 311 is an example of a first acquisition unit configured to acquire authentication information corresponding to an authentication apparatus from a plurality of pieces of authentication information stored in an authentication target device, when the authentication target device is connected to the authentication apparatus. The authentication operation section 312 and the authentication IC 105 function as an authentication unit configured to execute an authentication operation for authentication information acquired by the first acquisition unit. The second memory 303 functions as a holding unit configured to hold authentication information subjected to the authentication operation by the authentication unit. The second acquisition section 314 is an example of a second acquisition unit configured to acquire, from the authentication target device, a last piece of authentication information subjected to the authentication operation and held in the authentication target device, among the plurality of pieces of authentication information stored in the authentication target device, when the authentication target device is removed from the authentication apparatus and connected to the authentication apparatus again. The determination section 315 is an example of a determination unit configured to determine whether or not the authentication target device has been exchanged in other authentication target device, based on the last piece of authentication information subjected to the authentication operation and acquired by the second acquisition unit, and authentication information held in the holding unit. The authentication apparatus 102 is provided as described above, and thus exchange detection of the authentication target device 100 is realized by a simple technique.

Viewpoint 9

The detection section 313 may function as a detection unit configured to detect whether or not authentication information is held in the holding unit when the authentication target apparatus is connected to the authentication apparatus. The first acquisition section 311 may be configured to transmit a first command requesting the authentication target apparatus to acquire authentication information corresponding to the authentication apparatus in a case where no authentication information is held in the holding unit. The second acquisition section 314 may transmit a second command for requesting the authentication target apparatus to acquire the last piece of authentication information subjected to the acquisition operation and held in the authentication target apparatus, in a case where authentication information is held in the holding unit. As illustrated in FIG. 4A or the like, the last-used key 212b is not stored in the second memory 303 immediately after the image forming apparatus 1 is activated. Thus, the commands may be used separately depending on whether or not the last-used key 212b is stored in the second memory 303.

Viewpoint 10

As illustrated in FIG. 4A or the like, each of the plurality of pieces of authentication information 210 stored in the authentication target apparatus may include the authentication key K. The authentication operation section 312 and the authentication IC 105 may execute an authentication operation for the authentication key. As described above, a derivative key determined from the authentication key may be used in place of the authentication key.

Viewpoint 11

Each of the plurality of pieces of authentication information 210 may further include a counter. When an authentication operation is executed for the authentication key by the authentication operation section 312 and the authentication IC 105, the counter associated with the authentication key may be updated. Accordingly, it becomes easier to manage the number of times the authentication key has been authenticated.

Viewpoint 12

The determination section 315 may determine whether or not the authentication target apparatus has been exchanged in another authentication target device, based on whether or not both the first condition and the second condition are satisfied. The counter C is taken into account in addition to the authentication key K, and thus exchange detection may be realized with higher precision.

Viewpoint 13

The update section 316 functions as an update unit configured to update a counter included in the authentication information, when the authentication unit executes an authentication operation for an authentication key included in the authentication information acquired by the first acquisition unit. The second memory 303 may hold authentication information including an authentication key subjected to the authentication operation by the authentication unit, and a counter updated by the update unit. The counter C is taken into account in addition to the authentication key K, and thus exchange detection may be realized with higher precision.

Viewpoint 14

As illustrated in FIG. 1 and FIG. 2 or the like, according to the present embodiment, the authentication target device 100 authenticated by the authentication apparatus 102 is provided. The first memory 202 functions as a storage unit configured to store the plurality of pieces of authentication information 210. The communication section 204, the management section 206, and the monitoring section 207 function as a transmission unit configured to transmit, to the authentication apparatus 102, authentication information corresponding to the authentication apparatus 102 among the plurality of pieces of authentication information stored in the storage unit. The second memory 203 functions as a holding unit configured to hold the authentication information (e.g., last-used key 212a) transmitted from the transmission unit. The authentication target device 100 is provided as described above, and thus exchange detection of the authentication target device 100 is realized by a simple technique.

Viewpoint 15 and 16

The communication section 204 and the analysis unit 205 function as a receiving unit configured to receive a command from the authentication apparatus 102. When the receiving unit receives a first command, the communication section 204 and the management section 206 transmit authentication information corresponding to the authentication apparatus to the authentication apparatus. When the receiving unit receives a second command different from the first command, the communication section 204 and the monitoring section 207 transmit the authentication information held in the holding unit to the authentication apparatus. The different commands are used as described above, and thus it becomes possible to clearly determine whether the authentication information 210 is requested, or the last-used key 212a is requested. Each of the plurality of pieces of authentication information stored in the authentication target device may include an authentication key. The authentication key which is included in the authentication information sent to the authentication device may be subjected to an authentication operation by the authentication device.

Viewpoint 17

The update unit 208 may function as an update unit configured to update a counter of the authentication information transmitted in response to reception of the first command, the authentication information being stored in the storage unit and the holding unit. The counter is updated as described above, and thus exchange detection of the authentication target apparatus is also realized by a plurality of authentication apparatuses using the same ID (key identification information).

Viewpoints 18 to 21

As illustrated in FIG. 1 and FIG. 7, the image forming apparatus 1 on which the authentication apparatus 102 is mounted may also be provided. An exchangeable part of the image forming apparatus 1 (e.g., a cartridge of the image forming unit 13) on which the authentication target device 100 is mounted may be provided. Accordingly, it becomes possible to realize exchange detection of a consumable (exchangeable part) of the image forming apparatus 1 by a simple technique.

Miscellaneous

Although the authentication target device 100 and the authentication apparatus 102 are applied to the image forming apparatus 1 in the above-described embodiments, the authentication target device 100 and the authentication apparatus 102 may be used in other electronic apparatus. That is, the present invention can be applied to any electronic apparatus that requires a consumable or an exchangeable part.

In addition, the authentication information transferred from the authentication target device 100 to the authentication apparatus 102 may be information only including key information, or may be information including other data such as a counter or the like added to the key information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-090078, filed May 10, 2019 and Japanese Patent Application No. 2020-033758, filed Feb. 28, 2020 which are hereby incorporated by reference herein in their entirety.

What is claimed is:

1. An authentication method for an authentication system having an authentication target device, and a first authentication device and a second authentication device configured to authenticate the authentication target device, the first authentication device including a first memory and a first processor connected to the first memory, the second authentication device including a second memory and a second processor connected to the second memory, and the authentication target device including a third memory, a fourth memory and a third processor connected to the third memory and the fourth memory, the method comprising:

requesting, by the first processor of the first authentication device, the authentication target device to acquire a first piece of authentication information corresponding to the first authentication device, from a plurality of pieces of authentication information stored in the authentication target device;

reading, by the third processor of the authentication target device, the first piece of authentication information requested by the first authentication device out of the third memory a of the authentication target device and transmitting the first piece of authentication information to the first authentication device;

receiving, by the first processor of the first authentication device, the first piece of authentication information from the authentication target device, causing the first memory of the first authentication device to hold the first piece of authentication information, and executing an authentication operation for the first piece of authentication information;

requesting, by the second processor of the second authentication device to which the authentication target device removed from the first authentication device is attached, the authentication target device to acquire a second piece of authentication information corresponding to the second authentication device, from a plurality of pieces of authentication information stored in the third memory of the authentication target device;

reading, by the third processor of the authentication target device, the second piece of authentication information requested by the second authentication device out of the third memory of the authentication target device, causing the fourth memory of the authentication target device to hold the second piece of authentication information, and transmitting the second piece of authentication information to the second authentication device;

receiving, by the second processor of the second authentication device, the second piece of authentication information from the authentication target device, and executing an authentication operation for the second piece of authentication information;

requesting, by the first processor of the first authentication device to which the authentication target device removed from the second authentication device is attached again, the authentication target device to acquire the second piece of authentication information held in the fourth memory of the authentication target device;

reading, by the third processor of the authentication target device, the second piece of authentication information requested by the first authentication device out of the fourth memory of the authentication target device, and transmitting the second piece of authentication information to the first authentication device; and receiving, by the first processor of the first authentication device, the second piece of authentication information from the authentication target device, comparing the second piece of authentication information with the first piece of authentication information held in the first memory of the first authentication device, and determining whether or not the authentication target device has been used by another authentication device different from the first authentication device.

2. The authentication method according to claim 1, wherein the first processor of the first authentication device determines that the authentication target device has not been used by other authentication device different from the first authentication device, in a case where the second piece of authentication information acquired from the fourth memory of the authentication target device matches the first piece of authentication information held in the first memory of the first authentication device, and determines that the authentication target device has been used by other authentication device different from the first authentication device, in a case where the second piece of authentication information acquired from the fourth memory of the authentication target device is different from the first piece of authentication information held in the first memory of the first authentication device.

3. The authentication method according to claim 2, wherein each of the plurality of pieces of authentication information includes an authentication key, and the first authentication device and the second authentication device executes an authentication operation for the authentication key.

4. The authentication method according to claim 3, wherein each of the plurality of pieces of authentication information further includes a count value, and when an authentication operation is executed for the authentication key, the authentication target device updates the count value associated with the authentication key.

5. The authentication method according to claim 4, wherein the first processor of the first authentication device determines whether or not the authentication target device has been used by another authentication device different from the first authentication device, based on whether or not an authentication key included in the second piece of authentication information acquired from the fourth memory of the authentication target device matches an authentication key included in the first piece of authentication information held in the first memory of the first authentication device, and whether or not a count value included in the second piece of authentication information acquired from the fourth memory of the authentication target device matches a count value included in the first piece of authentication information held in the first memory of the first authentication device.

6. The authentication method according to claim 1, wherein the first processor of the first authentication device determines whether or not authentication information is held in the first memory of the first authentication device, transmits a first command requesting the authentication target device to acquire the first piece of authentication information corresponding to the first authentication device, in a case where no authentication information is held in the first memory, and transmits a second command requesting the authentication target device to acquire the second piece of authentication information held in the fourth memory of the authentication target device, in a case where authentication information is held in the first memory.

7. The authentication method according to claim 6, wherein the first command and the second command are different commands.

8. An authentication apparatus for authenticating an authentication target device, the apparatus comprising:

a memory and a processor connected to the memory, the processor configured to:

acquire authentication information corresponding to the authentication apparatus from a plurality of pieces of authentication information stored in the authentication target device, when the authentication target device is connected to the authentication apparatus;

execute an authentication operation for authentication information acquired by the processor;

control the memory to hold authentication information subjected to the authentication operation by the processor;

acquire, from the authentication target device, a last piece of authentication information subjected to the authentication operation and held in the authentication target device, among the plurality of pieces of authentication information stored in the authentication target device, when the authentication target device is removed from the authentication apparatus and connected to the authentication apparatus again; and determine whether or not the authentication target device has been exchanged in other authentication target device, based on the last piece of authentication information subjected to the authentication operation and acquired by the processor and authentication information held in the memory.

9. The authentication apparatus according to claim 8, wherein the processor is further configured to:

detect whether or not authentication information is held in the memory when the authentication target device is connected to the authentication apparatus;

transmit a first command requesting the authentication target device to acquire authentication information corresponding to the authentication apparatus in a case where no authentication information is held in the memory and transmit a second command for requesting the authentication target device to acquire the last piece of authentication information subjected to the authentication operation and held in the authentication target device, in a case where authentication information is held in the memory.

10. The authentication apparatus according to claim 9, wherein each of the plurality of pieces of authentication information stored in the authentication target device includes an authentication key, and the processor executes an authentication operation for the authentication key.

11. The authentication apparatus according to claim 10, wherein each of the plurality of pieces of authentication information further includes a count value, and when an authentication operation is executed for the authentication key by the processor, the count value associated with the authentication key is updated.

12. The authentication apparatus according to claim 11 wherein the processor is further configured to determine whether or not the authentication target device has been exchanged in another authentication target device, based on whether or not an authentication key included in the authentication information acquired by the processor matches an authentication key included in the authentication information held in the memory, and whether or not a count value included in the authentication information acquired by the processor matches a count value included in the authentication information held in the memory.

13. The authentication apparatus according to claim 12, wherein the processor is further configured to:
update a count value included in the authentication information, when the processor executes an authentication operation for an authentication key included in the authentication information acquired by the processor,
wherein, the memory is further configured to hold authentication information including an authentication key subjected to the authentication operation by the processor and a count value updated by the processor.

14. An image forming apparatus comprising:
an image forming unit configured to form an image on a sheet;
an authentication target unit mounted on an exchangeable part of the image forming unit; and
an authentication unit configured to authenticate the authentication target unit, wherein
the authentication unit includes:
a memory and a processor connected to the memory, the processor configured to:
acquire authentication information corresponding to the authentication unit from a plurality of pieces of authentication information stored in the authentication target unit, when the authentication target unit is connected to the authentication unit;
execute an authentication operation for authentication information acquired by the processor;
control the memory to hold authentication information subjected to the authentication operation by the processor;
acquire, from the authentication target unit, a last piece of authentication information subjected to an authentication operation and held in the authentication target unit, among a plurality of pieces of authentication information stored in the authentication target unit, when the authentication target unit is removed from the authentication unit and connected to the authentication unit again; and
determine whether or not the authentication target unit has been exchanged in another authentication unit, based on the last piece of authentication information subjected to the authentication operation and acquired by the processor and authentication information held in the memory.

15. The image forming apparatus according to claim 14, wherein the exchangeable part is a cartridge containing toner.

* * * * *